(12) United States Patent
Wittwer

(10) Patent No.: US 7,575,447 B2
(45) Date of Patent: Aug. 18, 2009

(54) ARRANGEMENT FOR CONNECTION OF PIPES

(75) Inventor: Martin Wittwer, Hude (DE)

(73) Assignee: AIRBUS Deutschland GmbH, Hamburg (DE)

( * ) Notice: Subject to any disclaimer, the term of this patent is extended or adjusted under 35 U.S.C. 154(b) by 0 days.

(21) Appl. No.: 11/974,491

(22) Filed: Oct. 12, 2007

(65) Prior Publication Data
US 2008/0102660 A1 May 1, 2008

Related U.S. Application Data

(60) Provisional application No. 60/851,670, filed on Oct. 13, 2006.

(51) Int. Cl.
*H01R 4/66* (2006.01)
(52) U.S. Cl. .................. 439/100; 174/84 S
(58) Field of Classification Search ............. 439/100, 439/91, 94, 108; 174/84 S
See application file for complete search history.

(56) References Cited

U.S. PATENT DOCUMENTS

| | | | |
|---|---|---|---|
| 3,228,714 A * | 1/1966 | Dricken | 285/236 |
| 3,705,735 A * | 12/1972 | Davidson et al. | 285/53 |
| 4,465,330 A * | 8/1984 | De Cenzo | 439/92 |
| 4,659,870 A * | 4/1987 | Jones | 174/84 S |
| 5,078,613 A * | 1/1992 | Salmon | 439/92 |
| 6,905,141 B2 * | 6/2005 | Winter et al. | 285/55 |
| 7,018,221 B2 * | 3/2006 | Daume | 439/100 |

FOREIGN PATENT DOCUMENTS

| | | | |
|---|---|---|---|
| EP | 566279 | | 12/1944 |
| EP | 588072 | | 5/1947 |
| GB | 2139724 A | * | 11/1984 |
| GB | 2274215 A | * | 7/1994 |

* cited by examiner

*Primary Examiner*—T C Patel
*Assistant Examiner*—Harshad C Patel
(74) *Attorney, Agent, or Firm*—Maginot, Moore & Beck

(57) ABSTRACT

An arrangement for connection of pipes includes a collar. In this case, the collar is provided for connection of the pipe ends of the pipes, and an earth connector is provided, by means of which the pipe ends can be electrically conductively connected. The earth connector is in this case in an integrated component of the collar, thus making it possible to make considerable savings in material and assembly effort, in comparison to known approaches. The arrangement results in a fluid-tight and electrically conductive connection of the pipes.

8 Claims, 6 Drawing Sheets

(D-D)

(A-A)

(C)

(B-B)

ARRANGEMENT FOR CONNECTION OF PIPES

CROSS-REFERENCE TO RELATED APPLICATIONS

This application claims the benefit of U.S. Provisional Application No. 60/851,670, filed Oct. 13, 2006, the entire disclosure of which is herein incorporated by reference.

FIELD OF THE INVENTION

The invention relates to an arrangement for connection of pipes.

BACKGROUND OF THE INVENTION

Although it can be used for any desired arrangements for connection of pipes, the present invention and the problems on which it is based will be explained in more detail with respect to pipes for carrying dirty water away in an aircraft.

There is a requirement in aircraft to carry dirty water, in particular from washing basins in the cabin, away to the exterior, that is to say into the atmosphere. Pipelines are provided for this purpose which are composed of a plurality of pipes connected to one another, in particular in order to comply with the geometric requirements in the aircraft. An arrangement must accordingly be provided for fluid-tight connection of the respective pipe ends of the pipes.

Lightning strikes, for example, can result in static electrical charging of pipes such as these which, in particular, are produced from stainless steel or titanium, and thus in an electrical potential difference between the pipes and the aircraft structure surrounding them. A potential difference such as this can have hazardous consequences, for example, incorrect measurements or destruction of electronics on board the aircraft. It is therefore necessary to dissipate the electrical charge from the pipes. This is generally achieved by connecting the pipes to one another by means of a plurality of electrical conductors and by dissipating the electrical charge to the exterior, that is to say into the atmosphere, at a specific point on the aircraft, by means of a further electrical conductor.

In consequence, there is a requirement for two pipes to be connected to one another not only such that they are fluid-tight but also electrically conductively. One approach that is known to the applicant provides an arrangement 1 as illustrated in FIG. 7. This arrangement 1 has a collar 2 with two holding sections 3, 4 in which a first and a second pipe end 5, 6, respectively, can be held in a fluid-tight manner. In addition, earth clamping rings 7, 8 are attached to the first and second pipe ends, at a distance from the collar 2. Those points on the pipe ends 5, 6 to which the earth clamping rings 7, 8 are fitted must then be treated with a specific sealing agent in order to prevent the ingress of moisture, and thus contact corrosion between the earth clamping rings 7, 8 and the first and second pipe ends 5, 6. An earth connector 9, that is to say an electrical conductor, is electrically conductively attached to the earth clamping rings 7, 8 by means of screw connections 10, 11 at each of its ends.

This approach disadvantageously results not only in a large amount of manual effort, but also in considerable weight.

The features of the precharacterizing clause of claim 1 are known both from GB 588 072 A and GB 566 279 A.

SUMMARY OF THE INVENTION

An object of the present invention is to provide a better arrangement which allows pipes to be connected both electrically and in a fluid-tight manner to one another in a simple manner, with the arrangement having little weight.

This object is achieved according to the invention by an arrangement having the features of Patent claim 1.

The idea on which the present invention is based comprises the arrangement for connection of pipes having a dual function. On the one hand, it provides a fluid-tight connection between the two pipe ends, and on the other hand it connects the two pipe ends electrically by means of the integrated earth connector. In this case, the earth connector is protected against the ingress of moisture, and thus against contact corrosion by the collar. In consequence, there is no need to provide any separate sealing agents for prevention of such contact corrosion. The collar in its own right represents a suitable sealing means.

Furthermore, the collar provides the holding function for making contact between the earth connector and the respective pipe ends. In comparison to the known approach, the invention therefore also makes it possible to dispense with the earth clamping rings as well as the screw connectors for attachment of the earth connector to the earth clamping rings.

Overall, this therefore results in a considerable weight saving in comparison to the known approach, and in a considerable reduction in the assembly effort.

The collar has at least two holding sections for fluid-tight holding of in each case one pipe end. This allows pipe ends to be connected easily by means of the collar.

The holding sections each have a section of the earth connector for making electrical contact with the respective pipe ends. Contact is therefore typically made between the pipe ends and the earth connector as soon as they are inserted into the holding sections of the collar.

The earth connector is arranged in one wall of the collar. This has the advantage that the earth connector is therefore located in a protected form in the collar and is held by it without any additional components, in order to make contact with the pipe ends.

The wall of the collar is cut out in places on the inside in the area of the respective holding sections, in order to expose sections of the earth connector in the wall. The earth connector is therefore accessible from the inside of the collar only at those points at which it is intended to come into contact with the pipe ends. The edges of the area cut out in the collar seal the exposed section of the earth connector against the pipe outer walls, in a fluid-tight manner, when the pipe ends are held in the holding sections. This makes it possible to prevent contact corrosion. Furthermore, the exposed sections of the earth connector, in particular in the case of elastic collars, are brought into electrical contact with the pipe outer walls just by pushing the pipe ends into the holding sections.

Advantageous refinements and improvements of the invention are specified in the dependent claims.

According to another exemplary embodiment of the invention, the arrangement also has pipe clamping rings, by means of which the exposed sections of the earth connector can be pressed against the respective pipe outer walls. This makes it possible to reduce the contact resistance between the pipe outer wall and the earth connector, thus making it possible to dissipate electrical charges more easily from the pipes.

In a further embodiment, the pipe ends each have a circumferential bead with the exposed sections of the earth connector being arranged behind the respective bead relative to a transverse center line of the collar. This allows the earth connector to be effectively sealed with respect to the fluid which is transported in the pipes.

In a further exemplary embodiment of the invention, end sections of the earth connector are looped around in the wall of the collar. This has the advantage that the earth connector is thus anchored firmly in the wall, preventing it from sliding out, in particular out of those areas of the wall of the collar which have been cut out in places. In this case, the expression "looping around" means that an end section of the earth connector is looped back in the opposite direction to its longitudinal extent. The looping-around process in this case may involve looping around fibres and/or at least, one layer of the glass-fibre-reinforced plastic of the collar.

According to a further embodiment of the invention, the earth connector is in the form of a strip, in particular a nickel-plated copper mesh. An earth connector such as this is distinguished by high conductivity with a small physical extent.

According to a further development of the invention, the collar is composed of plastic, in particular of a plastic which is elastic and/or is glass-fibre-reinforced. In particular, silicone may be used as the plastic. An elastic plastic automatically ensures that the collar rests in a fluid-tight manner against the pipe ends. Furthermore, this allows any angular discrepancy between two pipes to be compensated for easily. The glass fibres ensure that the collar is resistant to wear.

The collar may have a circular cylindrical cross section, with the internal diameter being for example 0.5 to 2.0 inches.

BRIEF DESCRIPTION OF THE DRAWINGS

The invention will be explained in more detail in the following text using exemplary embodiments and with reference to the attached figures of the drawing, in which.

In the figures, the same reference symbols denote identical or functionally identical components, unless stated to the contrary.

DETAILED DESCRIPTION OF THE INVENTION

Figure 1:
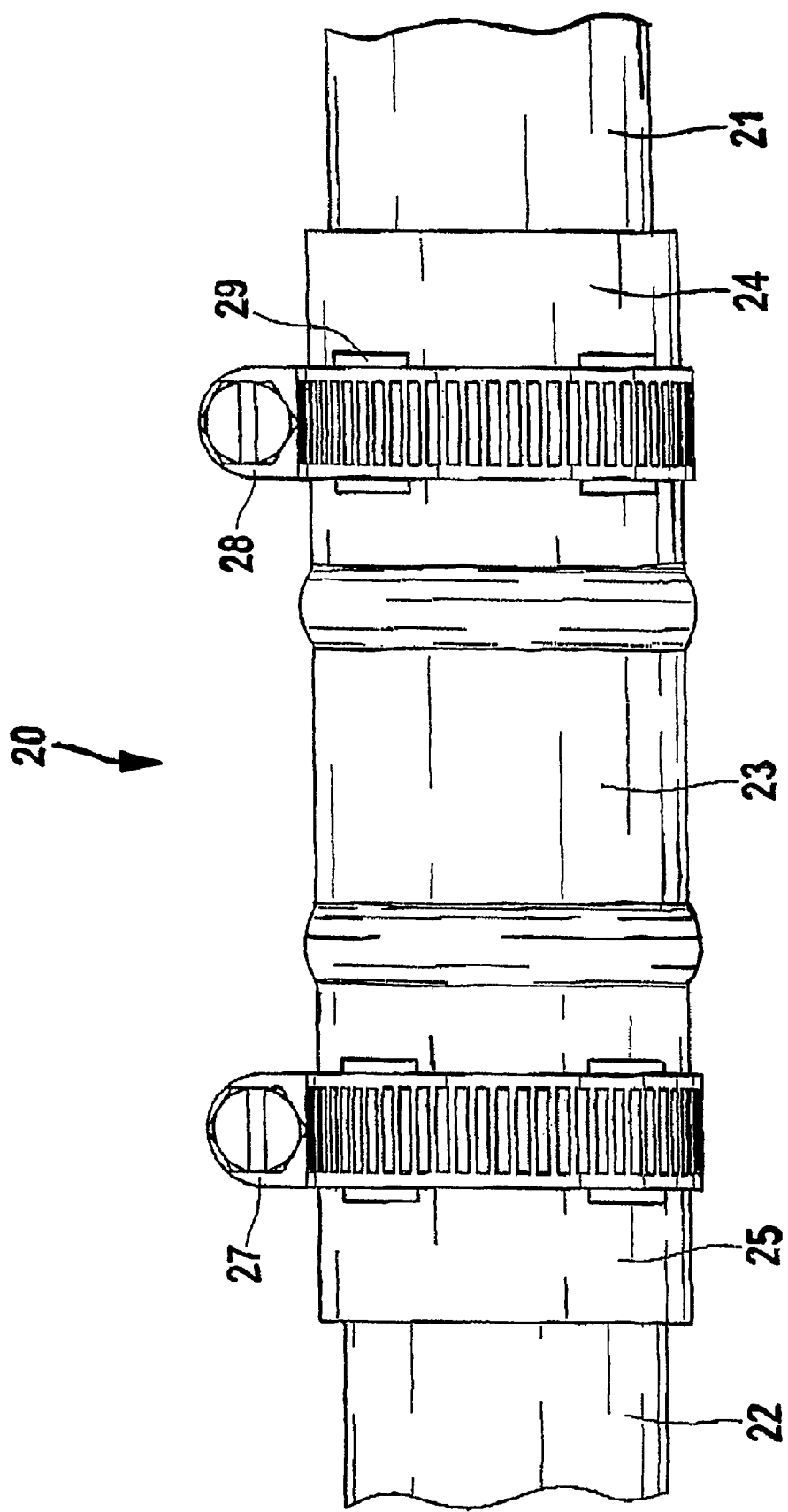
FIG. 1 shows a plan view of an arrangement according to one exemplary embodiment of the present invention.

The arrangement 20 illustrated in FIG. 1 connects two pipe ends 21, 22 to one another in a fluid-tight manner, and electrically. A collar 23 is provided for this purpose, with holding sections 24, 25 at each of its ends. The respective pipe ends 21 and 22 are held in the holding sections 24, 25. The pipe clamping rings 27, 28, also referred to as flexible-tube clamping rings, ensure that the pipe ends 21, 22 are held reliably in the holding sections 24, 25. Markings 29, in particular depressions, are provided on the outside of the collar 23 and allow accurate positioning of the pipe clamping rings 27, 28 on the collar 23.

Figure 2:
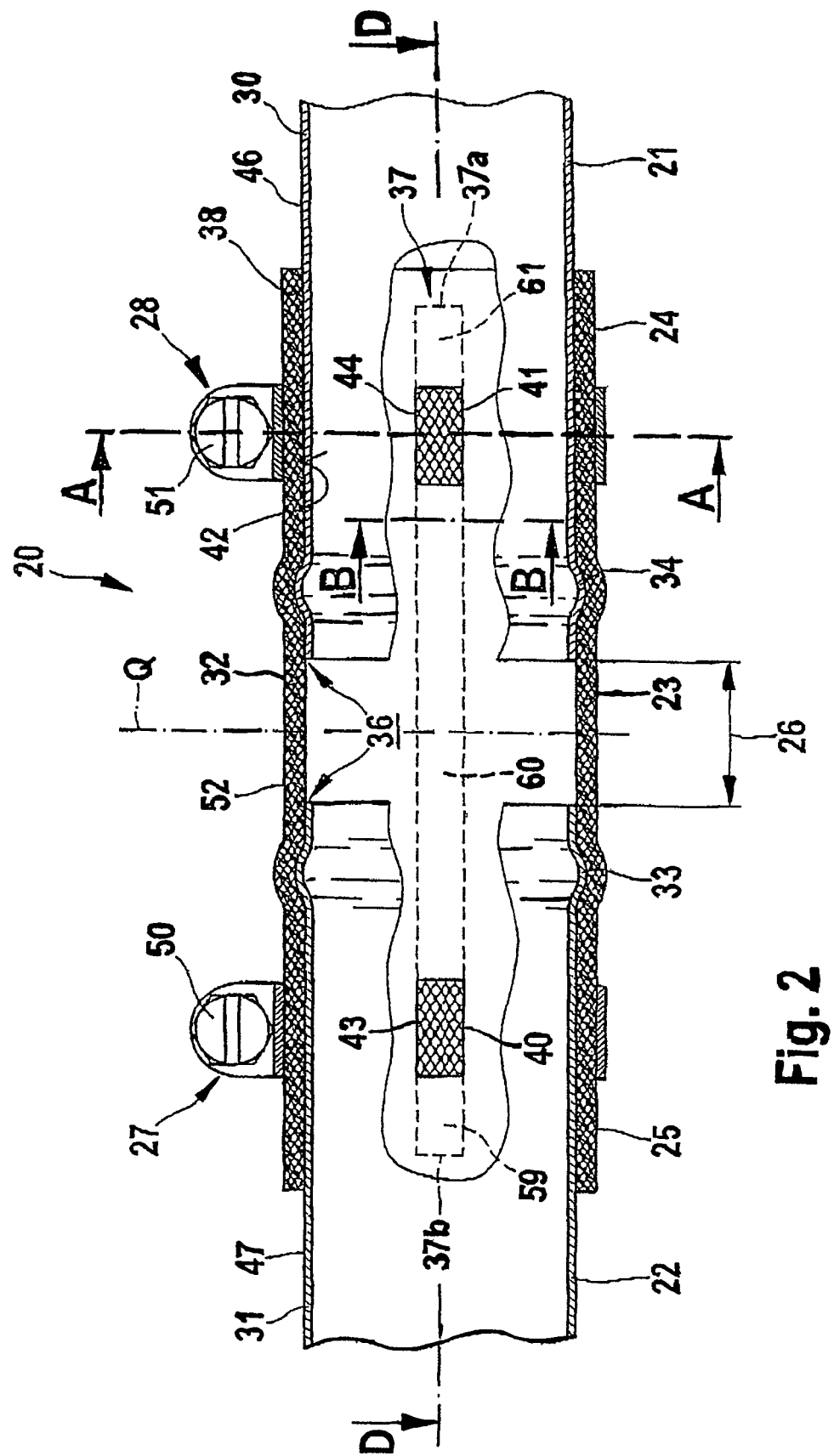
FIG. 2 shows a longitudinal section from FIG. 1.

FIG. 2 shows a longitudinal section along the longitudinal axis of the arrangement 20 shown in FIG. 1, with areas of the pipe walls 30, 31 of the pipe end 21 or 22, respectively, not being illustrated, in addition, in order to allow better understanding.

The pipe ends 21, 22 are provided with a respective bead 33, 34 at their respective ends. The collar 23 elastically clasps the pipe ends 21, 22, in particular with the beads 33, 34 preventing the fluid 36, which is flowing through the arrangement 20, from flowing out. For this purpose, the collar 23 may be made of an elastic plastic, and has a glass-fibre mesh 32 to reinforce it (for clarity reasons, the glass-fibre mesh is illustrated only in FIG. 2, and only in places even here).

An earth connector 37, which is for example in the form of a strip, and in particular is in the form of a nickel-plated copper mesh, lies in a protective form in the wall 38 of the collar 23 (indicated by the dashed lines, since it cannot be seen in FIG. 2). However, the wall 38 of the collar 23 is cut away in predetermined areas 40, 41, that is to say there are apertures from the inside 42 of the wall 38 of the collar 23 to the earth connector 37. Sections 43, 44 of the earth connector 37 are therefore exposed, and can make electrical contact with the outer wall 46, 47 of the pipe ends 21, 22. This can be seen particularly well in the section D-D in FIG. 2A. The width of the areas 40, 41 is preferably less than or equal to the width of the pipe clamping rings 27, 28. "Width" in this case relates to the extent in the longitudinal direction of the collar 23. This results in even better sealing of the exposed sections 43, 44 of the earth connector 37.

The earth connector 37 extends from the holding section 24 to the holding section 25, with each of its ends 37a, 37b preferably being looped around fibres 45 in a layer of the glass-fibre-reinforced plastic of the collar 23 in the wall 38, towards the transverse center line of the collar 23. This ensures that the earth connector 37 cannot be pulled out in the areas 40, 41 from the wall 38 of the collar 23 while the pipe ends 21, 22 are being pushed into or pulled out of the holding sections 24, 25, since this could adversely affect the operation of the arrangement 20.

The front ends of the two pipe ends 21, 22 preferably do not abut against one another, but are provided with a gap 26 between them, thus allowing angular movement between the two pipe ends 21, 22 and therefore assisting more flexible insertion of the pipe collar 23 in geometrically difficult conditions.

An electrical contact is produced for example between the sections 43, 44 and the respective pipe outer wall 46, 47. even without the pipe clamping rings 27, 28 making clamped contact with the outside 52 of the collar 23 by means of their clamping devices 50, 51 which are in the form of screw connecting devices. This is because the sections 43, 44 of the earth connector 37 are guided in the wall 38 such that they project in the areas 40, 41 towards the inside 42 of the wall 38. Alternatively, it is possible to provide for the thickness of the wall 38 in the areas 40, 41 to be less than the thickness of the earth connector 37, just as a result of the pipe ends 21, 22 being pulled into the holding sections 24, 25, respectively, and thus as a result of the wall 38 being stretched, such that this results in contact between the earth connector 37 and the outer wall 46, 47. The tightening of the clamping devices 50, 51 preferably just improves the electrical contact between the earth connector 37 and the pipe ends 21, 22.

Figure 3:
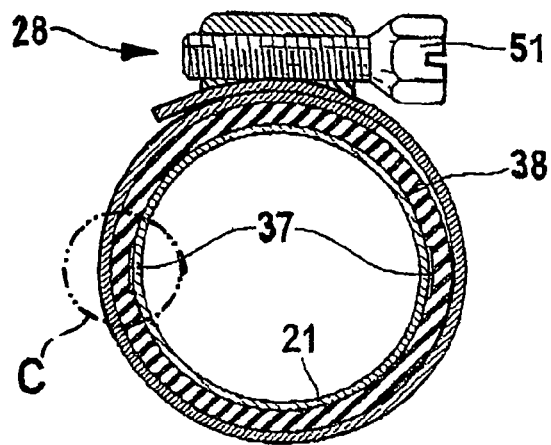
FIG. 3 shows a section view along the section line A-A in FIG. 2.
Figure 4:
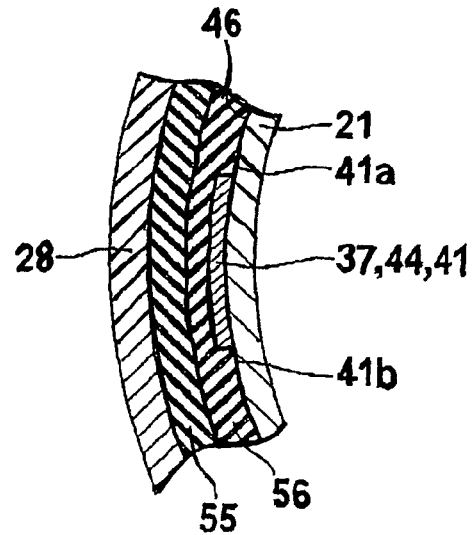
FIG. 4 shows an enlarged view C from FIG. 3.

FIG. 3 shows a section along the section line A-A in FIG. 2. This figure and in particular FIG. 4, which shows an enlarged view from FIG. 3, show how the section 44 of the earth connector 37 rests on the outer wall 46 of the pipe end 21, making electrical contact. The edge areas 41a, 41b of the wall 38 in particular seal the exposed section 44 of the earth connector 37 in interaction with the outer wall 46 so as to prevent the ingress of fluid to the section 44, and therefore contact corrosion.

In this case, the wall 38 may have a two-layer structure composed of layers 55, 56, each being made of a plastic with a glass-fibre mesh. The formation of the collar 23 from two layers 55, 56 makes it easier to introduce the guided earth connector 37 into the collar 23 during the production process.

Figure 2A:
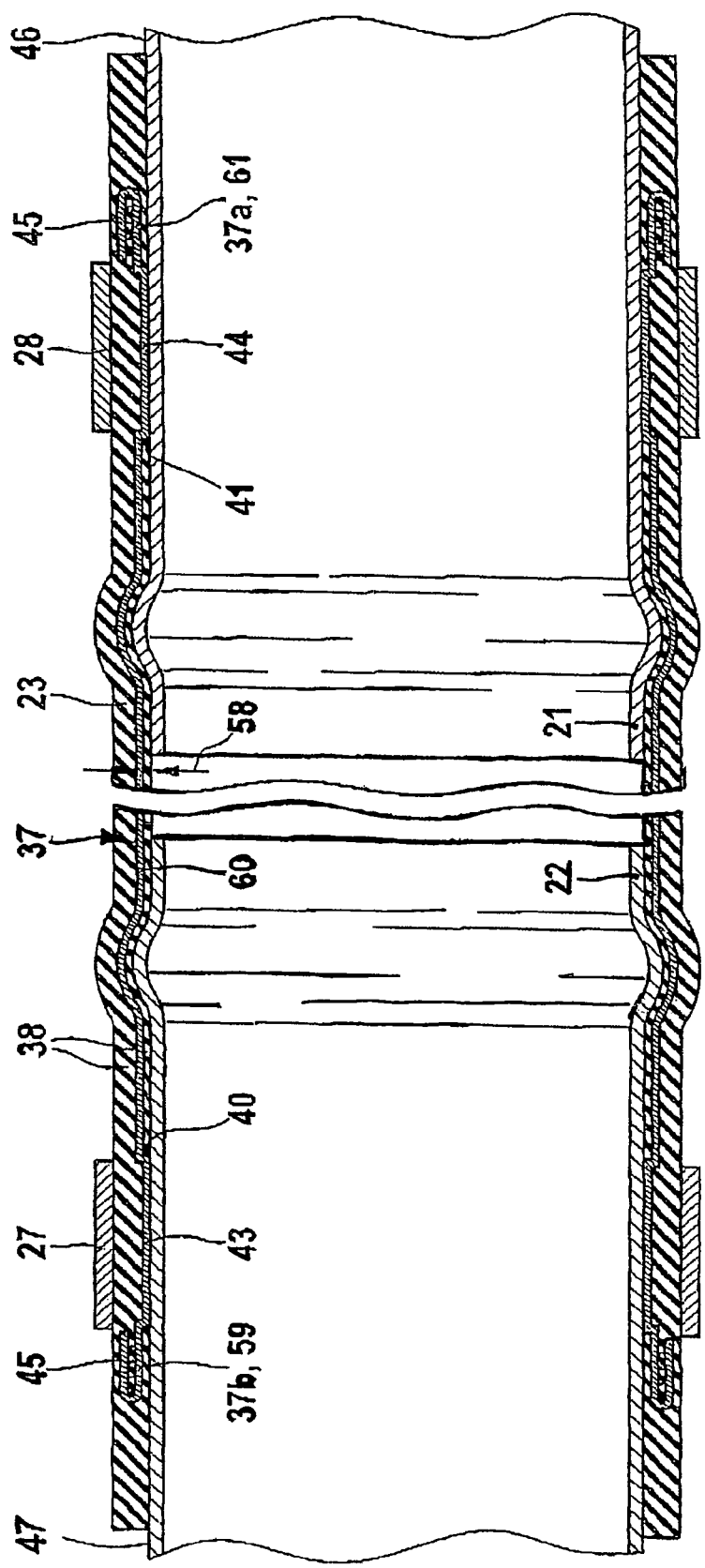
FIG. 2A shows an enlarged partial section view along the section line D-D in FIG. 2.
Figure 5:
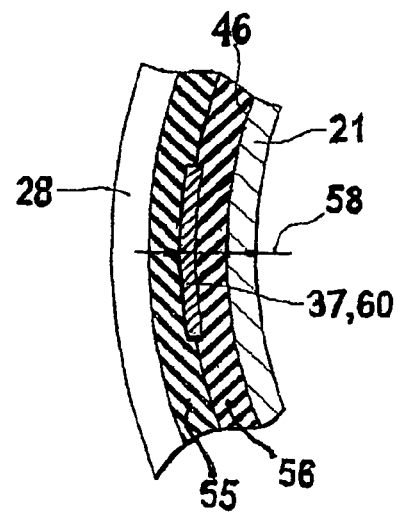
FIG. 5 shows a section view along the section line B-B in FIG. 2.

The earth connector 37 is passed under the pipe clamping rings 27, 28 in the wall 38 such that it passes through the inner face 42 of the wall 38 in the area 40, 41, and makes contact with the outer wall 46, 47 of the pipe ends 21, 22. As is illustrated in FIG. 2A and FIG. 5, which shows the section B-B in FIG. 2, the earth connector 37 enters the wall 38 of the collar 23 more deeply in front of and behind the areas 40, 41, with the earth connector 37 then being arranged at a distance from, and isolated from the outer wall 46, 47 by means of a material thickness 58. The earth connector 37 accordingly has electrically contact-making sections 43, 44 and, for example, electrically non-contact-making sections 59, 60, 61 (in this context, see FIG. 2). The non-contact-making section 60 is in this case arranged between the contact-making sections 43, 44.

A further earth connector may be introduced, in an analogous manner to the earth connector 37 but opposite it, into the wall 38 of the collar 23. This increases the electrical conductivity and thus reduces the electrical resistance of the arrangement 20, thus allowing electrical charges to be dissipated more easily from the pipe ends 21, 22.

Figure 6:
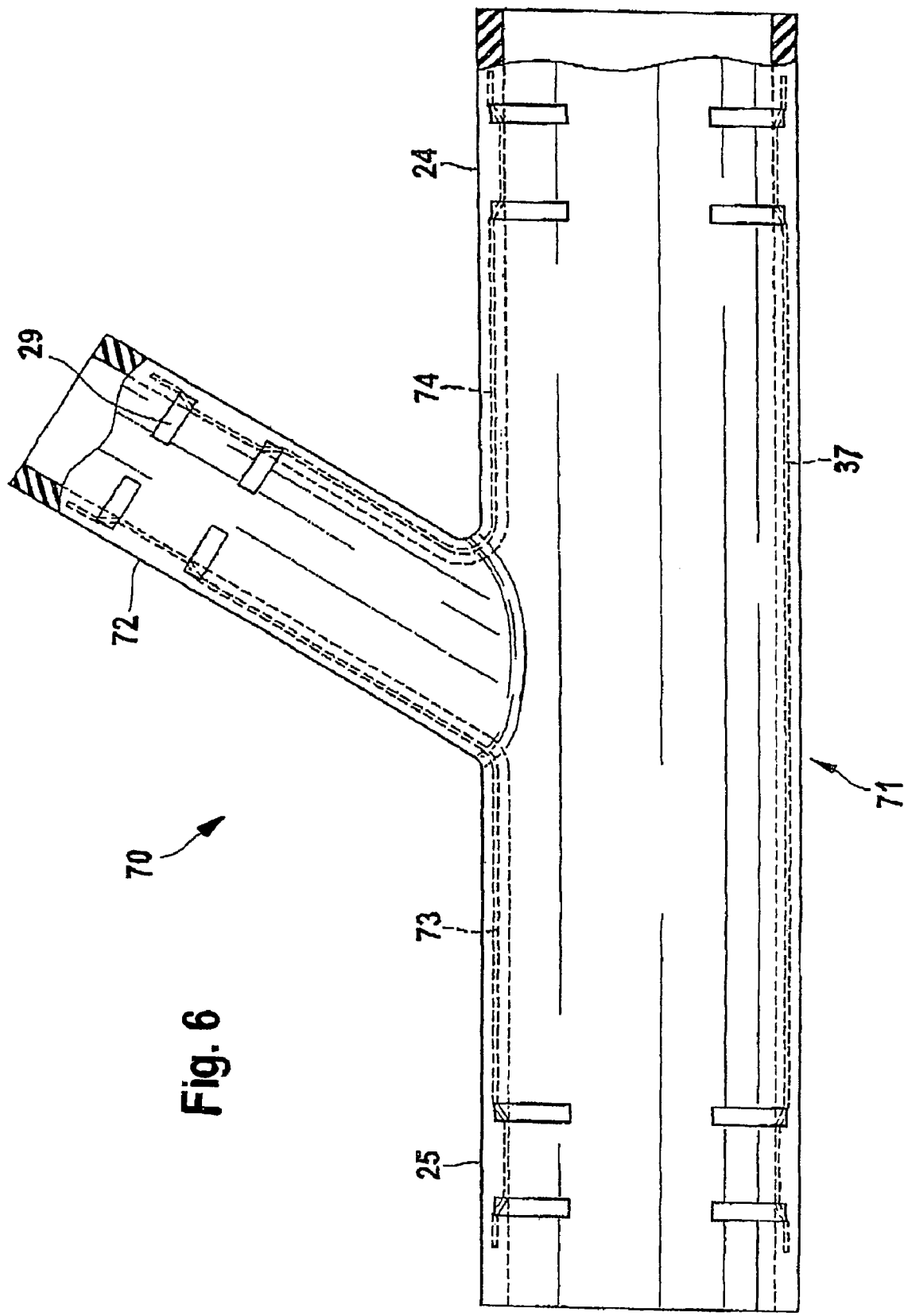
FIG. 6 shows a plan view of an arrangement according to a further exemplary embodiment of the invention.
Figure 7:
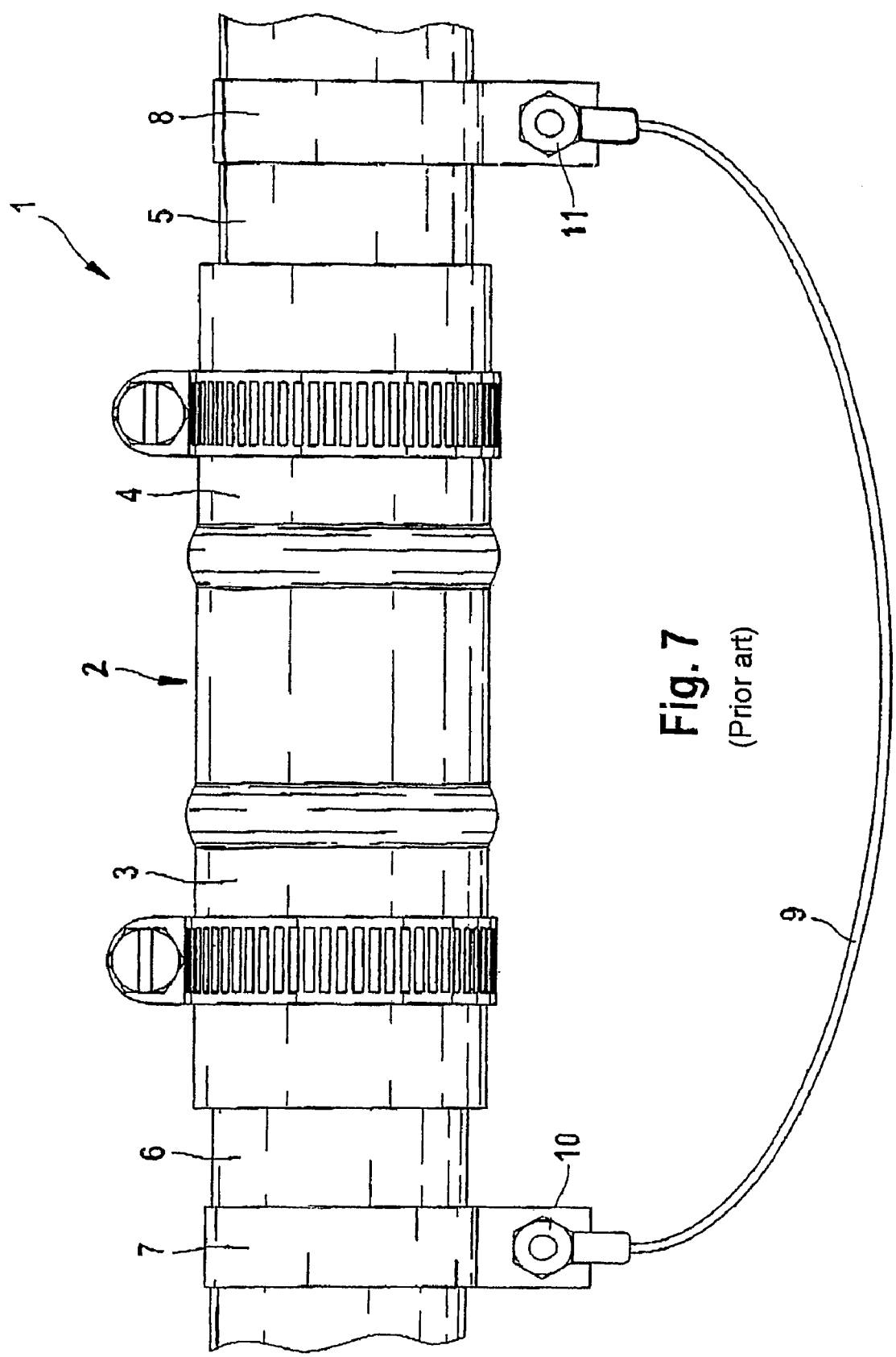
FIG. 7 shows a known arrangement for connection of pipes.

FIG. 6 shows an arrangement 70 for connection, for example, of three pipe ends to one another. The arrangement 70 is an essentially Y-shaped collar 71 with a further holding section 72 being fitted, in comparison to the exemplary embodiment shown in FIG. 1, for holding a further pipe end at an angle to a straight section, which has the holding sections 24, 25. The inserted pipe ends are not shown, in order to simplify the illustration.

The further holding section 72 is connected via a schematically illustrated earth connector 73 to the holding section 25, and is also connected via an earth connector 74, which is likewise illustrated schematically, to the holding section 24. The method of operation of the earth connectors 73, 74 in this case corresponds to that of the earth connector 37 in the exemplary embodiment shown in FIG. 1.

Although the present invention has been described above with reference to exemplary embodiments, it is not restricted to them but can be modified in many ways.

For example, more than two earth connectors can be provided in order to reduce the electrical resistance of the arrangement even further. In addition, it is feasible for more than three pipes to be connected electrically and in a fluid-tight manner. In particular, the shape of the earth connector can be varied. For example, the earth connector may be in the form of a spiral running in the wall of the collar. Furthermore, there is no restriction to Y-shaped arrangements. A T shape or a tapering shape of the collar can also be provided. Furthermore, other materials can also be used for the earth connector, for example silver.

The present invention therefore provides an arrangement for connection of pipes. In this case, a collar is provided for connection of the pipe ends of the pipes, and an earth connector is provided, by means of which the pipe ends can be electrically conductively connected. The earth connector is in this case in the form of an integrated component of the collar, thus making it possible to make considerable savings in material and assembly effort, in comparison to known approaches. The arrangement results in a fluid-tight and electrically conductive connection of the pipes.

What is claimed is:

1. An arrangement for connection of pipes, having a collar for connection of associated pipe ends of the pipes and having an earth connector, by which the associated pipe ends can be electrically conductively connected to one another, the earth connector being an integrated component of the collar, the collar having at least two holding sections for fluid-tight holding of one each of the associated pipe ends, the earth connector being arranged in one wall of the collar and being accessible only via cut-outs on the inside of the collar in the areas of the respective holding sections, the cut-outs exposing sections of the earth connector for making electrical contact with the respectively associated pipe end, in such a manner that plural edges of each cut-out area are sealed against outer circumferential surfaces of the pipe ends, in a fluid-tight manner, when the pipe ends are held in the holding sections.

2. The arrangement according to claim 1, wherein the arrangement also has pipe clamping rings, by means of which the exposed sections of the earth connector can be pressed against the respective pipe outer walls of the associated pipe ends.

3. The arrangement according to claim 1, wherein the associated pipe ends each have a circumferential bead, the exposed sections of the earth connector being arranged behind the respective bead relative to a transverse centre line of the collar.

4. The arrangement according to claim 1, wherein end sections of the earth connector are looped around in the wall of the collar.

5. The arrangement according to claim 1, wherein the earth connector is in the form of a strip.

6. The arrangement according to claim 1, wherein the collar is made of an elastic plastic.

7. An arrangement for connection of pipes, comprising:

a collar for connection of associated pipe ends of the pipes, the collar having at least two holding sections for fluid-tight holding of one each of the associated pipe ends; and an earth connector integrated into the collar, the earth connector arranged in a wall of the collar, and wherein the wall of the collar includes cut out portions on the inside proximate to the respective holding sections, each cut out portion defining a channel, the cut out portions configured to expose sections of the earth connector for making electrical contact with the respectively associated pipe end, the exposed sections of the earth connector substantially completely occupying the channel, such that edges of each cut out portion are sealed against outer circumferential surfaces of the pipe ends in a fluid-tight manner when the pipe ends are disposed in the holding sections.

8. The arrangement according to claim 7, further comprising a clamp that is isolated from the earth connector.

* * * * *